United States Patent [19]

Zielke

[11] Patent Number: 4,850,221

[45] Date of Patent: Jul. 25, 1989

[54] WIRE SENSING APPARATUS

[75] Inventor: Henry Zielke, Hoffman Estates, Ill.

[73] Assignee: Molex Incorporated, Lisle, Ill.

[21] Appl. No.: 243,567

[22] Filed: Sep. 12, 1988

[51] Int. Cl.$^4$ ............................................. G01B 13/00
[52] U.S. Cl. ..................................................... 73/37.5
[58] Field of Search ................. 73/37.5, 37.6; 81/9.51; 29/564.1; 33/DIG. 2

[56] References Cited

U.S. PATENT DOCUMENTS 3,407,505 10/1968 Parry ..................................... 73/37.5
4,601,093 7/1986 Cope ..................................... 81/9.51

Primary Examiner—Hezron E. Williams
Attorney, Agent, or Firm—Louis A. Hecht

[57] ABSTRACT

An apparatus is provided for accurately sensing the presence of an end of a wire in a position for stripping insulation therefrom or crimping a terminal thereto. The apparatus comprises a housing having an aperture extending therethrough for delivering a flow of low pressure air. A target is pivotally mounted to the housing and can undergo a small range of pivotal movement. The flow of air through the housing will urge the target to one extreme position in its range of pivotal movement. However, the end of a wire urged into contact with the target will cause the sensor target to pivot through its range of movement into a position for blocking the flow of air through the housing. Back pressure created by the blockage of air through the housing will be sensed by appropriate apparatus to initiate portions of the apparatus for stripping insulation from the wire or crimping a terminal thereto.

23 Claims, 3 Drawing Sheets

WIRE SENSING APPARATUS

BACKGROUND OF THE INVENTION

The insulation on a wire often must be stripped therefrom prior to the mechanical crimping or other such engagement of a conductive terminal onto the wire. The amount of insulation to be stripped must be carefully controlled to ensure that adequate mechanical and electrical connection is obtained between the terminal and the conductive portions of the wire. Conversely, the removal of too much insulation can leave a portion of the conductor exposed for possible contact with another electrically conductive lead, contact or the like.

Devices are available that are intended to strip a selected amount of insulation from the end of a wire, and/or to mechanically crimp or otherwise engage a terminal to the exposed conductive lead of the wire. Prior art insulation stripping devices of this type typically operate by inserting the insulated end of a wire into an apparatus. Upon insertion of the wire a specified distance into the apparatus, the wire is clamped to prevent further insertion or withdrawal, and a specified amount of insulation is stripped from the end. The stripping typically is carried out by opposed blades, at least one of which is movable generally orthogonal to the axis of the wire a sufficient amount to sever the insulation. The clamping means and/or the insulation cutting means then are appropriately moved to strip the insulation from the end of the wire. The same device or a similar device may then be employed to mechanically crimp or otherwise engage a terminal onto the exposed conductors at the stripped end of the wire.

The insertion of the wire into the prior art insulation stripper and/or terminal crimper and the removal of the stripped and/or terminated wire from the apparatus typically will be carried out automatically and very quickly. The stripper/crimper devices, however, must achieve a high degree of accuracy and repeatability to meet the quality control standards established by the manufacturers of electrical components and equipment.

A critical component for the accurate and reliable operation of an insulation stripper and/or terminal crimper is the actuation means which triggers the other parts of the device, such as the clamping members, blades and/or crimpers. An actuator that does not initiate movement of the other operative components of the stripper/crimper could easily lead to excessive wire being inserted into the prior art apparatus prior to actuation of the clamping means. This could result in stripping too much insulation from the wire, thereby creating the possibility for short circuits when the terminated wire is placed in an electrical apparatus. Alternatively, the presence of too much wire within the prior art insulation stripping and/or terminal crimping apparatus could urge the wire to a position relative to the blades where at least portions of the conductors would be severed. In still other instances, the axial movement of the clamps and blades of the prior art apparatus relative to one another might not be sufficient to completely remove the insulation from the extreme end of the wire. These and other such problems are most likely to occur with small gauge wires that may not be properly sensed by the actuator means within the prior art stripping/crimping apparatus. As a result, most prior art devices of this type require frequent adjustments.

An example of a known actuating means for an insulation stripper or terminal crimper is described in U.S. Pat. No. 4,601,093 which issued to Cope on July 22, 1986. The apparatus described in U.S. Pat. No. 4,601,093 includes an orifice into which the wire is directed. A sensor pad is spaced in line with the orifice and a selected distance therefrom. The sensor pad of the apparatus shown in U.S. Pat. No. 4,601,093 is attached to a piston which is generally axially aligned with the orifice and the wire passing therethrough, but which extends from the opposite side of the sensor pad. The piston to which the sensor pad shown in U.S. Pat. No. 4,601,093 is attached extends into a pneumatic cylinder. A coil spring within the cylinder is operative to urge the piston ring and the sensor pad outwardly from the cylinder. A wire directed through the orifice of the apparatus shown in U.S. Pat. No. 4,601,093 will be urged into the sensor pad, and is intended to exert an axial force on the sensor pad and the piston extending therefrom sufficiently great to overcome the opposing forces exerted by the coil spring. As a result, the piston of U.S. Pat. No. 4,601,093 is intended to move into the cylinder and against the force of the spring to open the seal around the piston, thereby causing an escape of air from the piston. The lowered pressure in the cylinder is intended to effect operation of a valve via a suitable actuator.

Although the pneumatic principles explained in U.S. Pat. No. 4,601,093 are well known and widely used, the mechanical principles have been difficult to perfect for reliable use in the manufacture of electrical components and devices. In particular, it is necessary to carefully balance the forces exerted by the spring on the piston rod of the apparatus shown in U.S. Pat. No. 4,601,093 with the forces that are likely to be exerted by the wire on the sensor pad. Very small diameter lightweight wires often will not exert adequate forces on the sensor pad to move the piston rod. Attempts to substantially minimize the forces exerted by the spring can result in the spring not exerting sufficient pressure to urge the piston rod out of the cylinder upon completion of a stripping or crimping operation. U.S. Pat. No. 4,601,093 appears to anticipate the sensitivity inherent in the structure by providing a plurality of orifices, sensor pads and spring actuated piston rods for wires of various different gauges. This results in the device being substantially more complex and costly. In view of these inherent problems, devices such as those shown in U.S. Pat. No. 4,601,093 are subject to substantial down time and require adjustments and fine tuning for even minor changes in wire specifications. A device similar to that of U.S. Pat. No. 4,601,093 is shown in West German Published Application No. 3,540,083 which was filed by Kirsten Kabeltech.

In view of the above, it is an object of the subject invention to provide an improved actuator device for an insulation stripper or terminal crimper.

It is another object of the subject invention to provide an actuator for an insulation stripper or terminal crimper that will reliably respond to forces exerted by both large and small gauge wire.

An additional object of the subject invention is to provide an actuator that is responsive to a broad range of wire gauges.

A further object of the subject invention is to provide an actuator for an insulation stripper and/or terminal crimper that is of simple construction.

Yet another object of the subject invention is to provide an actuator for an insulation stripper and/or terminal crimper that avoids the use of piston and cylinder actuator assemblies.

SUMMARY OF THE INVENTION

The subject invention is directed to a pneumatic sensor apparatus that is operative to sense the presence of the end of a wire in a specified location. Thus, the subject apparatus can be incorporated into an apparatus for stripping insulation from a wire and/or for crimping or otherwise mechanically engaging an electrically conductive terminal onto the stripped end of the wire. The sensor apparatus may comprise a housing having a sensor target pivotally mounted thereto. The housing may further comprise means for directing a flow of air toward the sensor target while the target is in a first pivotal position relative to the housing. The positioning of the sensor target in this first pivotal position relative to the housing may be achieved by gravity, or by the flow of air or both.

The sensor target and the housing may be mounted in an insulation stripper and/or terminal crimper apparatus, such that the end of a wire is urged into contact with the sensor target. The force exerted by the end of the wire against the sensor target is sufficient to pivot the sensor target toward the flow of air being directed through the housing.

The pivotal movement of the sensor target toward the flow of air in response to the small forces exerted by the end of the axially advancing wire will completely or partially block the flow of air from the sensor target housing. This complete or partial blockage of the flow of air from the sensor target housing creates a back pressure that can be sensed readily by pneumatic sensing means. Accordingly, the housing may be in communication with an electric pressure regulated switch or a pneumatic pilot operated valve which is operative to sense the back pressure created by the movement of the sensor target against the housing. The signal generated by the electric pressure regulated switch or pneumatic pilot operated valve indicates the presence of the end of the wire at a specified position, and thus may be operative to initiate one or more of the various components of an apparatus for stripping insulation from the wire and/or crimping a terminal thereto.

The subject sensor apparatus has been found to offer substantially greater reliability than systems that employ piston/cylinder assemblies for actuation. Furthermore, the apparatus described above and in greater detail below has been found to be much more sensitive which allows sensing a wider range of wire gauges without adjustments to the actuator or the associated stripper/crimper apparatus.

DETAILED DESCRIPTION OF THE PREFERRED EMBODIMENT

Figure 1:
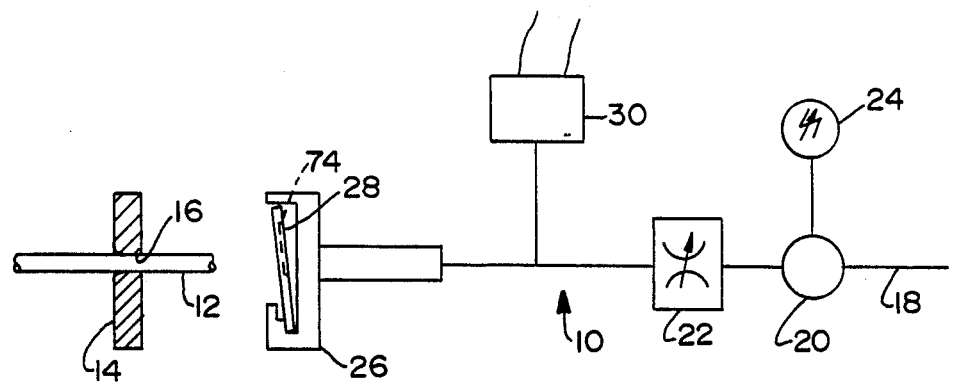
FIG. 1 is a schematic view of a pneumatically operated wire sensor apparatus employing the actuator of the subject invention.
Figure 2:
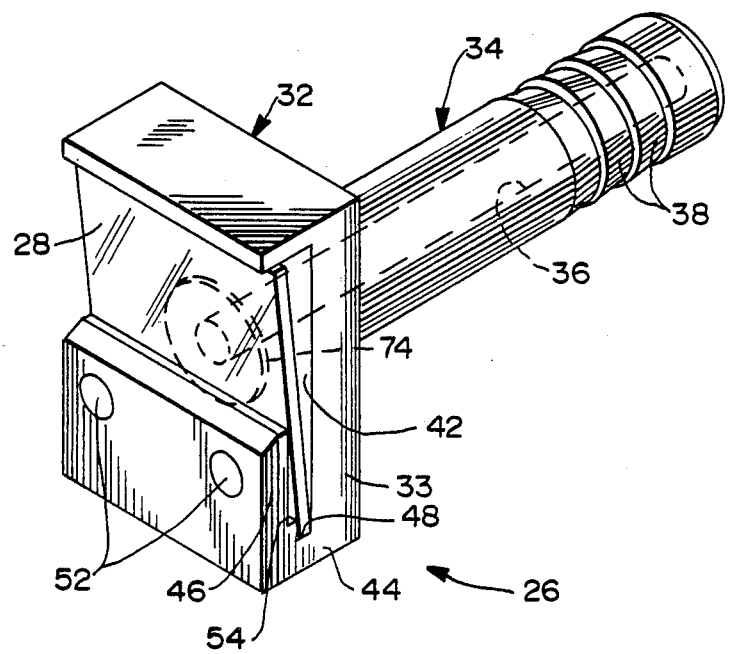
FIG. 2 is a perspective view of the sensor target assembly.
Figure 3:
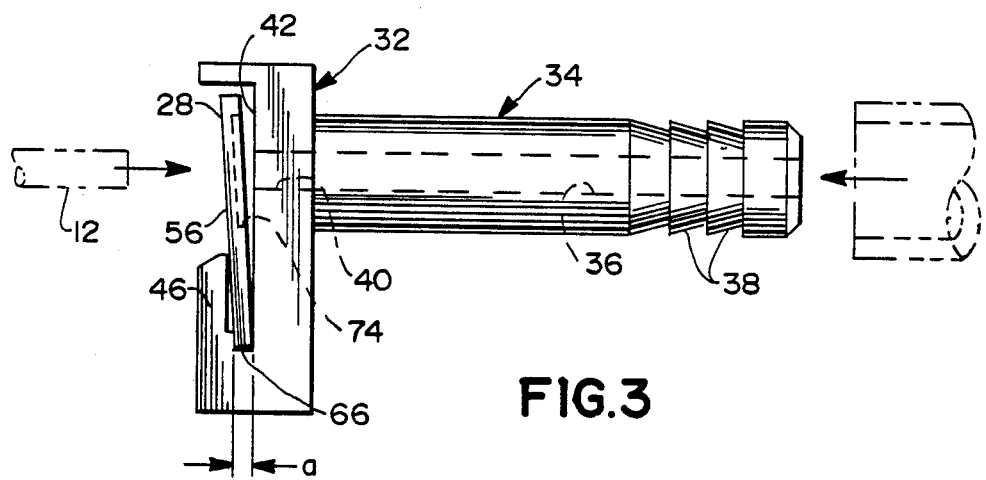
FIG. 3 is a side view of the sensor target assembly.

The pneumatic sensor apparatus of the subject invention is indicated generally by the numeral 10 in FIG. 1. The sensor apparatus 10 is used in combination with an apparatus (not shown) for stripping insulation from a wire 12 or for crimping a terminal onto the exposed conductors of the wire 12. The stripper or crimper comprises a guide 14 having an aperture 16 extending therethrough for receiving and guiding the wire 12 toward the sensor apparatus 10. The distance between the guide 14 and the sensor apparatus 10 typically is very small and may be adjustable in accordance with the required length of insulation to be removed from the wire and/or the specific construction of the terminal being crimped onto the stripped end of the wire 12.

The sensor apparatus 10 comprises a source of air identified generally by the numeral 18. The source of air is in communication with a pressure regulator 20 which in turn is in communication with a flow control valve 22 and a pressure gauge 24. Thus, a controlled flow of air can be directed from the source of air 18 through the valve 20, and can be carefully controlled and monitored by the pressure regulator 20, the flow control valve 22 and the gauge 24. Typically, the air delivered through the pressure regulator 20 will be at approximately 3 p.s.i.

The sensor system 10 further comprises a sensor target assembly identified generally by the numeral 26. The sensor target assembly 26 is described and illustrated in much greater detail below. However, for the purposes of describing the overall system, it is noted that the sensor target assembly 26 is in communication with the valve 22 to permit a flow of forced air to be directed to the target assembly 26. The sensor target assembly 26 comprises a sensor target 28 pivotally mounted thereto. The sensor target 28 is disposed at a location on the sensor target assembly 26 such that the pivotal movement of the sensor target 28 is operative to block the flow of air traveling to the sensor target assembly 26.

The sensor system 10 further comprises a pressure sensing means 30 which is operative to sense changes in pressure between the target assembly 26 and the valve 22. In particular, the pressure sensing means 30 may be an electric pressure regulated switch or a pneumatic pilot operated valve. The pressure sensing means 30 is specifically operative to sense the back pressure created when the target 28 is pivoted into a position for blocking the flow of air to the target assembly 26. Additionally, the pressure sensing means 30 is operative to generate an appropriate electrical or pneumatic signal in response to a sensed back pressure indicative of the pivotal movement of the target 28. The pressure sensing means is operatively connected to other parts of the wire stripper and/or terminal crimper such that the signal generated by the pressure sensing means 30 will initiate one or more selected operations by the wire stripper or crimper.

In operation, the wire 12 is urged longitudinally through the aperture 16 in the guide 14 and toward the sensor target 28. As will be explained in greater detail below, the sensor target 28 is operative to pivot toward other portions of the sensor target assembly 26 in response to forces generated by the longitudinal end of the wire 12 against the sensor target 28. The pivotal movement of the sensor target 28 against the other parts of the sensor target assembly 26 will deflect or terminate the flow of air to the sensor target assembly 26, thereby creating a back pressure which will be sensed by the pressure sensing means 30. The pressure sensing means will then generate a signal to initiate certain functions by the wire stripper or terminal crimper.

The sensor target assembly 26 is illustrated in greater detail in FIGS. 2–5. More particularly, the sensor target assembly 26 comprises a generally rectangular housing 32 having a rear wall 33 and a mounting nipple 34 extending therefrom. The mounting nipple 34 includes a centrally aligned through aperture 36 extending entirely therethrough to permit a flow of air as explained further below. The end of the mounting nipple 34 most distant from the rear wall 33 of the housing 32 is provided with an array of ribs 38 which permit an air hose to be mounted thereon.

The rear wall 33 of the housing 32 includes an aperture 40 which extends entirely through the housing 32 and communicates with the through aperture 36 in the nipple 34. Thus, air flowing through the nipple 34 is able to pass entirely through the rear wall 33 of the housing 32.

The rear wall 33 of the housing 32 comprises a planar front face 42 disposed on the side thereof opposite the nipple 34. The aperture 40 for delivering air through the rear wall 33 of the housing 32 intersects the planar front face 42 at a location generally centrally thereon.

The sensor target housing 32 further comprises a bottom wall 44 extending generally orthogonally from the planar front face 42 of the rear wall 33, and a front wall 46 disposed in generally spaced parallel relationship to the front face 42. The spaced relationship of the front wall 46 from the planar front face 42 defines a target mounting groove 48 of width "a" in the housing 32. The front wall 46 is further characterized by a pair of apertures 52 extending therethrough and into the area defined by the mounting groove 48. The apertures 52 are reamed dowel pin holes which permit the apertures 52 to receive hinge pins for laterally aligning the sensor target 28 in the mounting groove 48 and thereby preventing the sensor target 28 from "walking" out of the mounting groove 48 after repeated use. The side of the front wall 46 facing the mounting groove 48 defines a step 54, the dimensions of which are selected in accordance with the amount of angular pivoting preferred for the sensor target 28.

Figure 4:
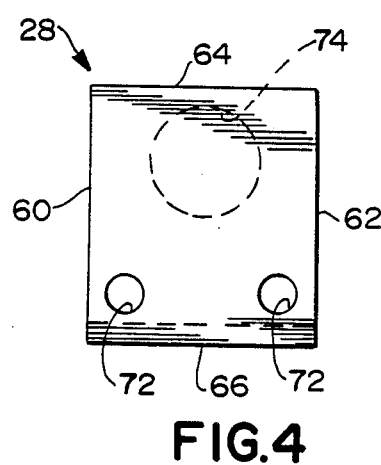
FIG. 4 is a front elevational view of the sensor target of the subject actuator.
Figure 5:
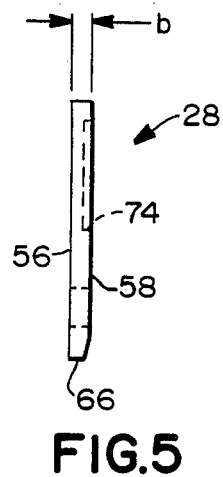
FIG. 5 is a side view of the sensor target shown in FIG. 4.

The sensor target 28 is illustrated in greater detail in FIGS. 4 and 5. More particularly, the sensor target 28 is of generally planar rectangular configuration with opposed front and rear faces 56 and 58, opposed side edges 60 and 62, a top edge 64 and a bottom edge 66. The target 28 defines a thickness "b" between the front and rear surfaces 56 and 58 thereof which is less than the width "a" of the groove 48 in the housing 32. The width of the sensor target 28, as measured between the side edges 60 and 62, and the height thereof as measured between the top and bottom edges 64 and 66 substantially corresponds to the dimensions of the front face 42 on the rear wall 33 of housing 32. The edge of the target 28 extending along the intersection of the bottom 66 and the rear surface 58 thereof is generally arcuate to facilitate a pivotal movement of the sensor target 28 within the mounting groove 48 of the housing 32. The sensor target 28 is further characterized by apertures 72 which align with the apertures 62 in the front wall 46 of the housing 32, to receive hinge pins and enable positive lateral alignment of the sensor target 28.

The rear face 58 of the sensor target 28 is unsmooth and nonplanar, and in particular is characterized by a generally circular recessed portion 74 which is disposed for alignment with the aperture 40 in the rear wall 33 of the housing 32. The recessed portion 74 functions as an air flow control means which substantially localizes the forces exerted by the flow of air through aperture 40 for keeping the sensor target 28 in a predetermined pivotal position, without requiring a large volume of air flow or a high speed of air flow through the aperture 40. For inexplicable reasons, it has been found that if the rear face 58 of the sensor target 28 is planar and smooth, the flow of air has the opposite of the anticipated effect, and causes the target 28 to pivot toward the rear wall 33 of the housing 32. The unsmooth and nonplanar construction afforded by the recessed portion 74 in the rear face 58 causes the air flow to urge the sensor target 28 away from the rear wall 33 of the housing 32.

The sensor target assembly 26 is oriented in a wire stripper and/or terminal crimper such that the surface 42 substantially defines a gravitationally aligned plane, and such that the nipple 34 is substantially orthogonal to a gravitational vector. Thus, in the absence of other forces, the sensor target 28 will be substantially balanced in a gravitationally aligned plane and generally in face-to-face relationship with the surface 42 of the housing 32. However, the flow of air through the passage 36 in the nipple 34, and through the aperture 40 in the housing 32 will cause the sensor target 28 to pivot slightly away from the front face 42 of the rear wall 33. The range of pivotal movement of the sensor target 28 away from the front face 42 of housing 32 is controlled by the front wall 46 of the housing 32. However, forces exerted by the longitudinal end of a wire 12 on the front surface 56 of the sensor target 28 will causes the sensor target 28 to pivot back toward the front face 42 of the rear wall 33. In particular the forces exerted by movement of the wire 12 will overcome the small force exerted by the low volume, low pressure flow of air through the aperture 40 in the rear wall 33 of housing 32. The pivotal movement of the sensor target 28 in response to forces exerted by the end of wire 12 will block the flow of air, thereby creating a back pressure that can be sensed by the apparatus depicted in FIG. 1 above.

Importantly, it should be noted that the force exerted by the air pressure to keep the sensor target 28 in a pivoted position away from the front face 42 of the rear wall 33 of housing 32 can be very low, with a 3.0 p.s.i. typically being sufficient in view of the gravitational orientation of front face 42 of the housing 32. Additionally, the force required by the wire 12 to cause the sensor target 28 to pivot back toward the housing 32 is very low, both in view of the low air pressure exerted against the sensor target 28, and in view of the small range of angular movement from the gravitational orientation that is permitted. Thus, even a very small gauge wire will be sufficient to pivot the sensor target 28 into face-to-face relationship with the front face 42 of the rear wall 33 of housing 32, to thereby create the back pressure that will be sensed by the apparatus depicted in FIG. 1.

Figure 6:
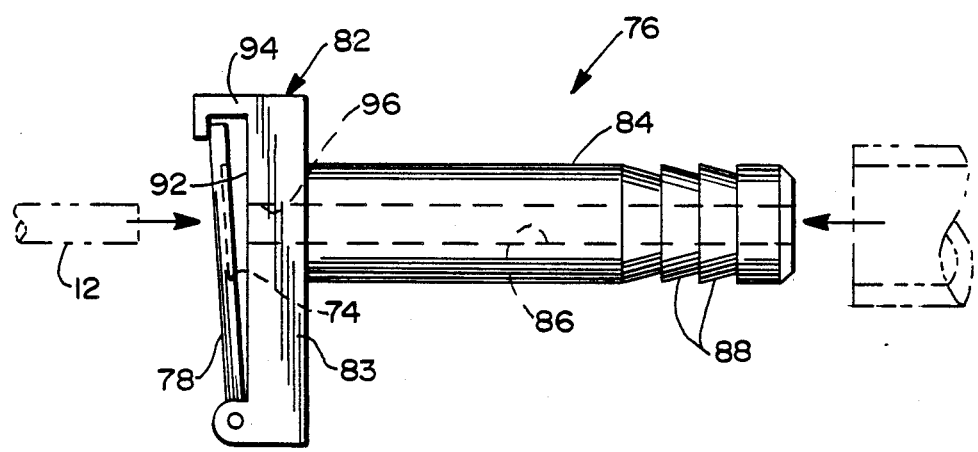
FIG. 6 is a side elevational view of an alternate sensor target assembly in accordance with the subject invention.

An alternate embodiment of the sensor target assembly of the subject invention is depicted in FIG. 6. More particularly, the sensor target assembly 76 comprises a sensor target 78 hingedly connected to a housing 82 for pivotal movement relative thereto. A nipple 84 extends from the housing 82 and includes a through aperture 86 extending therethrough for delivering a flow of air to the housing 82. The flow of air may be delivered by a tube mounted over an array of external ribs 88 disposed on a portion of the nipple 84 spaced from the housing 82. The housing 82 further comprises a rear wall 83 having an aperture 90 extending entirely therethrough to intersect a planar front face 92 thereof. Thus, the housing 82 and nipple 84 depicted in FIG. 6 are substantially similar to the housing 32 and nipple 34 described above. However, the housing 82 includes no front wall adjacent the bottom of the sensor target 78 for controlling the range of pivotal movement. Rather, the housing 82 is characterized by a top wall 94 and a short front wall 96 extending therefrom in generally spaced parallel relationship to the front face 92 of the rear wall 83. The target 78 is disposed intermediate the front face 92 of the rear wall 83 and the front wall 96, such that the rotational limits of the target 78 are clearly defined.

The sensor target assembly 76 depicted in FIG. 6 operates substantially identically to the sensor target assembly 26 described and illustrated above. In particular, the flow of air through the aperture 90 urges the sensor target 78 into a rotational movement away from the front face 92. The range of rotational movement is positively limited to a small angular amount by the front wall 96. The flow of air passing through the aperture 90 in the housing 82 can be maintained very low, as defined above, in view of the initial generally gravitational orientation of the front face 92 of the rear wall 83 of housing 82. The low air pressure delivered through aperture 90 and the very small range of angular movement of the sensor target 78 results in very low forces required to urge the sensor target 78 back into face-to-face contact with the front face 92 of rear wall 83 of housing 82. Thus, the forces to urge the sensor target 78 into generally face-to-face contact with the front face 92 can be delivered by a very small gauge wire. Furthermore, the gravitational orientation of the front face 92 of the rear wall 83 when combined with the flow of air passing through aperture 90 will positively ensure that the sensor target 78 will pivot away from the front face 92 of the rear wall 83 when the wire is retracted from the sensor target assembly 76.

In summary, a sensor target assembly is provided for use with a wire stripper or terminal crimper apparatus to positively signal the presence of a small gauge wire in a position to have the insulation stripped therefrom or to have a terminal crimped thereon. The apparatus comprises a housing having means for delivering a low pressure flow of air therethrough. A sensor target is pivotally mounted to the housing such that in a first pivotal position the target permits the flow of air through the housing, while in a second pivotal position the target at least partially blocks the flow of air through the housing. The housing is gravitationally oriented to ensure very low forces for pivoting the sensor target throughout its range of movement. In operation the flow of air will urge the target to one extreme in its ranges of pivotal movement. An axially moved wire urged into the contact with the sensor target, however, will pivotally move the sensor target into a position for blocking the flow of air through the housing. The blockage of the flow of air will create a back pressure that can be sensed by appropriate pressure sensing apparatus and/or switches to indicate that the wire is in a position for initiating apparatus to strip the insulation therefrom or to crimp a terminal thereon.

While the invention has been described with respect to a preferred embodiment, it is apparent that various changes can be made without departing from the scope of the invention as defined by the appended claims.

I claim:

1. An apparatus for sensing the presence of an end of a wire, said apparatus comprising:
   a housing having aperture means extending therethrough for permitting a flow of air through said housing;
   means for delivering a flow of air to said aperture means in said housing;
   a sensor target pivotally mounted adjacent said housing for selective pivotal movement toward and away from the aperture in said housing, said sensor target being disposed in the path of the wire to be sensed;
   stop means for positively controlling the range of pivotal movement of said sensor target away from said housing, whereby said flow of air is operative to pivot said sensor target toward said stop means, and whereby movement of the wire into contact with the sensor target is operative to urge said sensor target toward said aperture means in said housing for obstructing the flow of air therethrough.

2. An apparatus as in claim 1 wherein the housing comprises a surface aligned substantially vertically.

3. An apparatus as in claim 2 wherein said surface is substantially planar.

4. An apparatus as in claim 1 wherein said sensor target comprises at least one arcuate edge about which said target is pivotable relative to said housing.

5. An apparatus as in claim 1 wherein the sensor target comprises air flow control means for enabling said air flow to pivot said sensor target toward said stop means.

6. An apparatus as in claim 5 wherein the sensor target comprises a rear face disposed in generally opposed relationship to said aperture means in said housing, said rear face comprising said air flow control means.

7. An apparatus as in claim 6 wherein said air flow control means comprises an unsmooth portion on said rear face.

8. An apparatus as in claim 6 wherein said air flow control means comprises a nonplanar portion on said rear face.

9. An apparatus as in claim 6 wherein said air flow control means comprises a recess in said rear face generally aligned with the flow of air through said housing.

10. An apparatus as in claim 1 wherein said housing comprises a rear wall having a generally planar front face against which said target is engageable, said rear wall comprising said aperture means extending therethrough for directing the flow of air through said rear wall and toward said sensor target.

11. An apparatus as in claim 10 wherein said housing comprises a bottom wall extending from said rear wall and a front wall extending from said bottom wall and disposed in a generally spaced relationship to said rear wall, said rear wall, said bottom wall and said front wall defining a mounting groove therebetween for pivotally retaining the sensor target therein.

12. An apparatus as in claim 11 wherein said front wall defines the stop means for said apparatus.

13. An apparatus as in claim 1 wherein said housing comprises a rear wall having opposed top and bottom ends, said sensor target being hingedly connected to said rear wall adjacent the bottom end thereof, said housing further comprising a top wall extending from the top end of said rear wall and a front wall extending from said top wall and spaced from said rear wall, said front wall defining said stop means of said apparatus for controlling the pivotal movement of said sensor target away from said rear wall.

14. An apparatus for sensing the presence of an end of a wire in a predetermined location, said apparatus comprising:
   means for longitudinally guiding said wire toward said predetermined location;
   a sensor target assembly disposed generally at said predetermined location, said sensor target assembly comprising a housing having aperture means extending therethrough for permitting a flow of air through said housing, a sensor target pivotally mounted to said housing for pivoting movement toward and away from said aperture means, and stop means for controlling the amount of pivotal movement of said sensor target away from said aperture means;
   air delivery means for providing a controlled flow of air toward the aperture means of said housing;
   pressure sensing means in communication with said air delivery means for sensing a back pressure created by the pivoting movement of said sensor target toward said aperture means in said housing, said sensing means being operative to generate a signal in response to a sensed change in pressure caused by movement of said sensor target against the aperture means in said housing.

15. An apparatus as in claim 14 wherein the housing of said sensor target assembly comprises a generally vertically aligned wall through which said aperture means extends, said vertically aligned wall defining one extreme of pivotal motion of said sensor target relative to said housing.

16. An apparatus as in claim 14 wherein said housing comprises a top and a bottom, said sensor target being pivotal to said housing generally adjacent the bottom thereof.

17. An apparatus as in claim 16 wherein said housing further comprises a mounting groove formed in a portion thereof generally adjacent the bottom of said housing, said sensor target being pivotally mounted in said mounting groove of said housing for pivotal movement toward and away from the aperture means.

18. An apparatus as in claim 17 wherein the stop means for controlling the range of pivoting movement of said sensor target away from the aperture means in said housing is defined by a wall defining a portion of the groove in the housing.

19. An apparatus as in claim 14 wherein said sensor target is hingedly mounted to said housing.

20. An apparatus as in claim 14 wherein said sensor target comprises a rear face for substantially engaging and surrounding said aperture means in said housing, said rear face of said sensor target comprising air flow control means for enabling said air flow from said housing to pivot said sensor target toward said stop means.

21. An apparatus as in claim 20 wherein said air flow control means comprises an unsmooth portion on said rear face.

22. An apparatus as in claim 20 wherein said air flow control means comprises a nonplanar portion on said rear face.

23. An apparatus as in claim 20 wherein said air flow control means comprises a recess in said rear face generally aligned with the flow of air through said housing.

* * * * *